United States Patent

Yokonuma et al.

[11] Patent Number: 5,708,882
[45] Date of Patent: Jan. 13, 1998

[54] CAMERA CAPABLE OF CHANGING PHOTOGRAPHIC SCREEN SIZE AND METHOD

[75] Inventors: Norikazu Yokonuma, Kanagawa-ken; Kazuyuki Kazami, Tokyo-to; Hideo Hibino; Youichi Yamazaki, both of Kanagawa, all of Japan

[73] Assignee: Nikon Corporation, Tokyo, Japan

[21] Appl. No.: 779,119

[22] Filed: Jan. 6, 1997

Related U.S. Application Data

[63] Continuation of Ser. No. 352,690, Dec. 1, 1994, abandoned.

[30] Foreign Application Priority Data

Dec. 14, 1993 [JP] Japan ................... 5-313716

[51] Int. Cl.⁶ .............. G03B 17/20; G03B 7/26; G03B 13/10
[52] U.S. Cl. ............. 396/296; 396/302; 396/378; 396/436
[58] Field of Search ............ 354/484, 222, 354/159, 94; 396/287, 302, 380, 296, 301, 303, 378, 435, 436

[56] References Cited

U.S. PATENT DOCUMENTS

| | | | |
|---|---|---|---|
| 5,159,364 | 10/1992 | Yanagisawa et al. | 354/21 |
| 5,204,715 | 4/1993 | Nakanishi et al. | 354/475 |
| 5,218,399 | 6/1993 | Izumi et al. | 354/471 |
| 5,255,030 | 10/1993 | Mukai et al. | 354/94 |
| 5,309,195 | 5/1994 | Goo et al. | 354/484 |
| 5,389,998 | 2/1995 | Dunsmore et al. | 354/484 |
| 5,410,381 | 4/1995 | Kameyama et al. | 354/222 |
| 5,471,265 | 11/1995 | Shibata et al. | 354/76 |
| 5,541,707 | 7/1996 | Sasagaki et al. | 354/474 |
| 5,640,631 | 6/1997 | Saito | 396/380 |

*Primary Examiner*—Safet Metjahic
*Assistant Examiner*—Christopher E. Mahoney
*Attorney, Agent, or Firm*—Oliff & Berridge

[57] ABSTRACT

A camera includes a display that displays in the viewfinder a photographic screen size even when the low consumption power supply mode is in use. The camera includes a power source, a controller, a film winding motor, a panorama frame driving motor, a CPU, an EEPROM, a viewfinder LCD and a timer. When the power switch is turned on, the CPU causes the panorama frame to move and changes the transmissivity of the viewfinder LCD to match the photographic screen size selected the largest number of times. When a new photographic screen size is selected using the photographic screen size switch, the number of times the photographic screen size has been selected is calculated and stored in the EEPROM. In addition, the time that has elapsed after the power switch has been turned on is measured by the timer, and when the time exceeds a predetermined value, the camera moves into the low consumption power supply mode with power still being supplied to the viewfinder LCD.

15 Claims, 6 Drawing Sheets

CAMERA CAPABLE OF CHANGING PHOTOGRAPHIC SCREEN SIZE AND METHOD

This is a continuation of application Ser. No. 08/352,690 filed Dec. 1, 1994 now abandoned.

BACKGROUND OF THE INVENTION

1. Field of the Invention

The present invention relates to a camera that can be switched among a plurality of screen sizes including a panorama screen size, and in which a display in the viewfinder is changed so that the size of the screen is known.

2. Description of Related Art

A camera is known in which the aperture width is changed by moving a panorama frame, photography being possible in different screen sizes such as, for example, a panorama screen size or a high-vision screen size. With such a camera, the photographic range (i.e., the image to be photographed) is indicated to the photographer when the aperture width is changed through a display in the viewfinder in accordance with either of two manners of display.

First, the photographic range in which photography is possible for each photographic screen size is displayed in the viewfinder by thin lines (i.e., the thin lines frame the port ion of the image to be photographed). Second, a liquid crystal display is provided in the viewfinder, and the photographic range is indicated by changing the transmissivity of part of the liquid crystal display in accordance with the photographic screen size (so that only the image that will be photographed passes through the viewfinder; for example, in close-up photography, edge sections of the viewfinder are made non-transmissive).

However, in the first manner of display, there is concern about errors in the photographic range by photographers who do not verify which of the photographic screen sizes is currently set because the thin lines that indicate the photographic range for each photographic screen size are always displayed in the viewfinder.

In the second manner of display, it is impossible to know the correct photographic range when the power switch of the camera is off because at the time, the liquid crystal display is completely transmissive. In addition, in a camera equipped with a low consumption power supply mode to which the power source is automatically switched after a predetermined time interval, after the power switch is engaged, power is not supplied to the liquid crystal display in the viewfinder when the low consumption power supply mode is in use, again making it impossible to know the correct photographic range.

SUMMARY OF THE INVENTION

It is an object of the present invention to provide a camera capable of switching the photographic screen size in which a display is accomplished in the viewfinder in accordance with the selected photographic screen size even when the low consumption power supply mode is in use.

The invention is applied to a camera capable of switching between two or more photographic screen sizes, and includes a screen size switching device that switches the photographic screen size at least between a first screen size and a second screen size. A display accomplishes a display in the viewfinder in accordance with the photographic screen size selected by the switching device. A power source includes a normal power supply mode that supplies power to the various parts of the camera when the power switch is switched from off to on, a low consumption power supply mode that supplies a smaller amount of power than the normal power supply mode after a predetermined time has elapsed after the power switch is switched on, and a power interruption mode that halts the supply of power when the power switch is switched off. A controller controls the display to provide a display in the viewfinder in accordance with the photographic screen size switched to by the screen size switching device when the power source is in the normal power supply mode or the low consumption power supply mode, thereby accomplishing the above objective.

The camera may further include a counter that counts the number of times each photographic screen size is selected, and a first selector that selects the photographic screen size having been counted the largest number of times by the counter. When the power switch is on, and the photographic screen size switching device is switched to the photographic screen size selected by the first selector, the controller controls the display to provide a display in the viewfinder that matches the photographic screen size selected by the first selector.

In accordance with another aspect of the invention, a camera includes a screen size switching device that switches the photographic screen size between a panorama screen size and a plurality of other screen sizes. A display provides a display in the viewfinder in accordance with the photographic screen size selected by the switching device. A power source includes a normal power supply mode that supplies power to the various parts of the camera when the power switch is switched from off to on, a low consumption power supply mode that supplies a smaller amount of power than the normal power supply mode after a predetermined length of time has elapsed after the power switch is switched on, and a power interruption mode that halts the supply of power when the power switch is switched off. The camera may also include a counter that counts the number of times each photographic screen size is selected, and a second selector that selects the photographic screen size having been counted the largest number of times by the counter, excluding the number of times the panorama screen size is selected. A controller controls the display to provide a display in the viewfinder in agreement with the photographic screen size selected by the second selector after photography with the panorama screen size has been completed. The screen size switching device is switched to the photographic screen size selected by the .second selector after photography with the panorama screen size has been completed, thereby accomplishing the above objective.

According to one aspect of the invention, the display is controlled by the controller to provide a display in the viewfinder in accordance with the photographic screen size switched to by the screen size switching device when either the normal power supply mode or the low consumption power supply mode is selected by the power source. Thus, verification of the photographic range corresponding to the photographic screen size can be accomplished even when the low consumption power supply mode is in use.

According to another aspect of the invention, when the power switch is on, the photographic screen size counted the largest number of times by the counter is selected by the first selector, the screen size switching device switching to the selected photographic screen size, and the display being controlled by the controller to provide a display in the viewfinder in accordance with the selected photographic screen size. By this structure, the photographic screen size most frequently used by the photographer is promptly selected when the power source in the camera is engaged.

With a further aspect of the invention, the photographic screen size counted the largest number of times by the counter is selected by the second selector excluding the number of times the panorama screen size is selected, and when photography using the panorama screen size is completed, the display is controlled by the controller to provide a display in the viewfinder in accordance with the photographic screen size selected by the second selector. By this structure, the photographic screen size most frequently used by the photographer is promptly selected when panorama photography is completed.

Of course, the embodiments of the present invention set forth herein are intended to be illustrative, not limiting.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
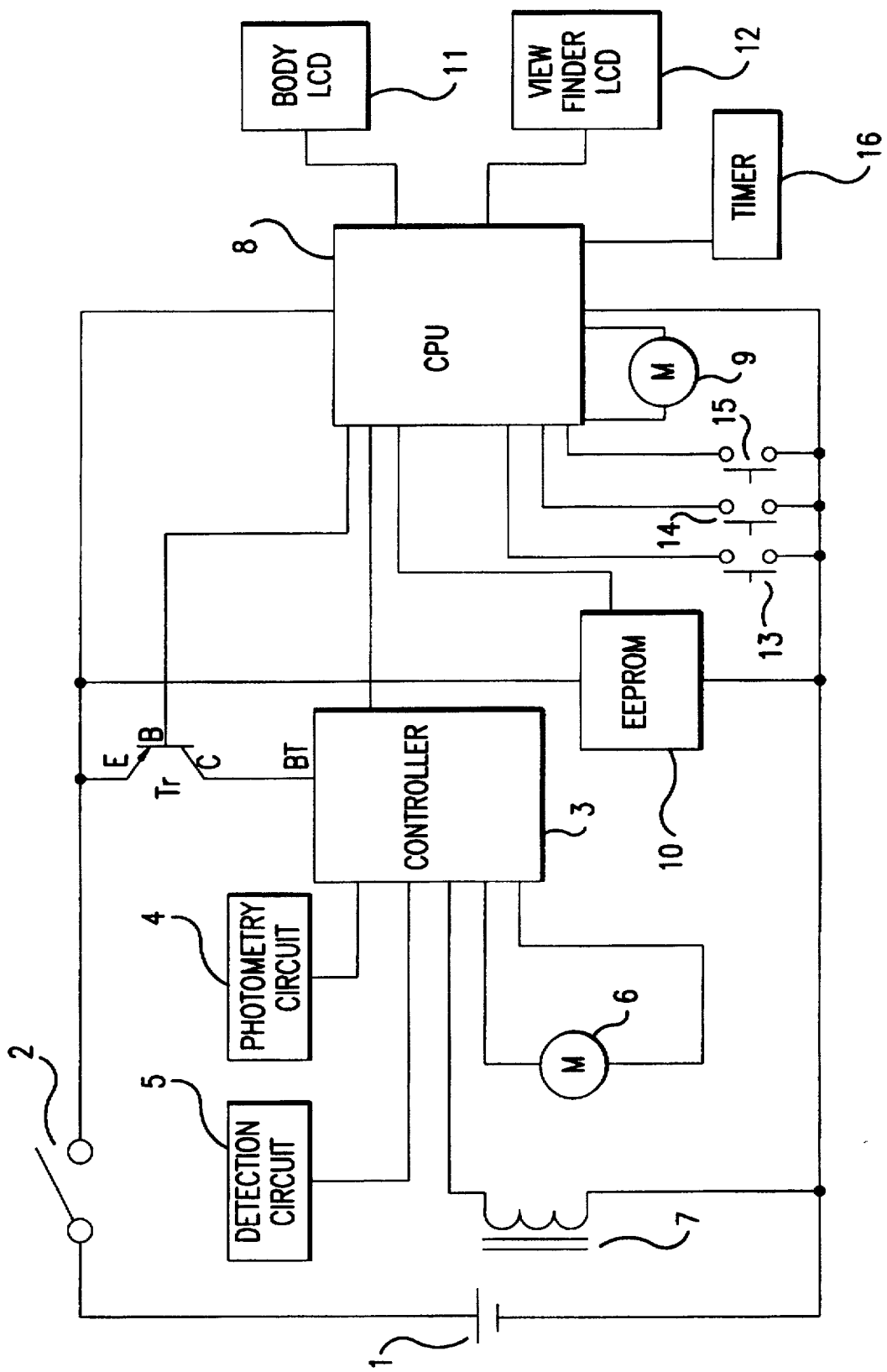
FIG. 1 is a block diagram of an embodiment of a camera according to the present invention.
Figure 2C:
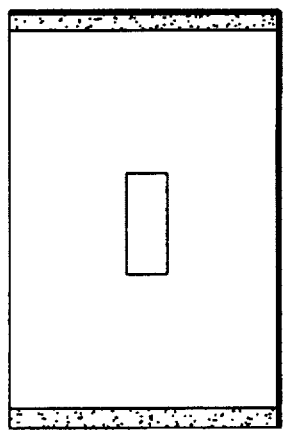
FIGS. 2(a)–2(c) show the display in the viewfinder.
Figure 2B:
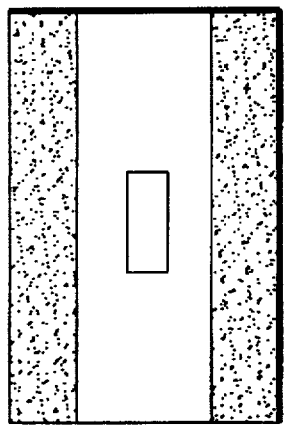
Figure 2A:
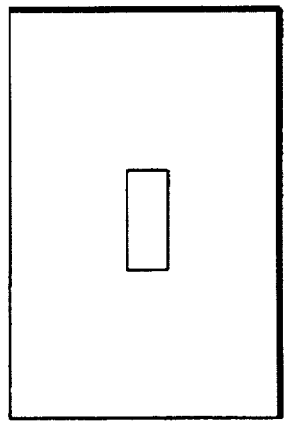

FIG. 1 is a block diagram of an embodiment of a camera according to the present invention, and FIGS. 2(a)–2(c) show different displays in the viewfinder. An embodiment of the present invention is described hereafter with reference to the drawings.

In FIG. 1, reference numeral 1 designates a power source that supplies power to the various parts of the camera when a power switch 2 is turned on, the power source being endowed with three modes that differ in the amount of power consumption, namely, a normal power supply mode, a low consumption power supply mode and a power interruption mode. Of these, the normal power supply mode is the mode to which the power source moves when the power switch 2 is changed from off to on, and of the above-described three modes, it is the mode in which consumption of power from the power source 1 is the greatest. The low consumption power supply mode is the mode to which the power source is switched after a predetermined time interval has elapsed following the switching of the power switch on, in which mode the consumption of power from the power source 1 is smaller than in the normal power supply mode. In other words, in the low consumption power supply mode, power is supplied only to a limited number of areas in the camera, such as the viewfinder LCD, as will be explained hereinafter.

Reference numeral 3 designates a controller that accomplishes exposure and similar computations. To the controller 3 are connected a photometry circuit 4, which measures the brightness of the subject, a focus adjustment information detecting circuit 5, which detects focus adjustment information, a film winding motor 6, which winds a film (not shown), and a shutter magnet 7, which controls the opening and closing of a shutter (not shown).

Reference numeral 8 designates a CPU, which accomplishes the processes in FIGS. 3 to 6, which are explained hereinafter. To the CPU 8 are connected a panorama frame driving motor 9, which moves a panorama frame (not shown) of the camera in accordance with the selected photographic screen size, an EEPROM 10 in which are stored the various initial data of the camera, a camera body LCD 11, which displays the number of photographs taken and the like, and a viewfinder LCD 12 in which the transmissivity of part of the liquid crystal changes in accordance with the photographic screen size. The viewfinder LCD 12 is provided in front of (on the side of the eyepiece lens toward the subject) an eyepiece lens (not shown) in the viewfinder.

In addition, the CPU 8 is also connected to a half-depressed switch 13 that turns on when a release button of the camera is depressed halfway, a completely depressed switch 14 that turns on when the release button is completely depressed, and a photographic screen size switch 15 that commands switching of the photographic screen size. When the switch 15 is depressed, the normal screen size, panorama screen size and high-vision screen size are selected in turn (toggled) each time the switch is depressed. When, for example, the high-vision screen size is selected by the switch 15, the panorama frame moves, and an aperture of the camera is set to the high-vision screen size, while at the same time the transmissivity of part of the viewfinder LCD 12 changes to provide a display in the viewfinder as indicated by FIG. 2(a). Similarly, when the panorama screen size or the normal screen size is selected, a display is provided in the viewfinder as indicated by FIGS. 2(b) and 2(c), respectively.

The CPU 8 is connected to a timer 16 that measures the time interval for changing to the low consumption power supply mode. The CPU 8 is also connected to the base B of a transistor Tr. The collector C of the transistor Tr is connected to the power source terminal BT of the controller 3. When a positive voltage is impressed on the base B of the transistor Tr by the CPU 8, power is supplied to the controller 3, and the controller 3 begins to operate. In other words, power is supplied to the controller 3, and the controller operates only when commanded by the CPU 8.

Figure 3:
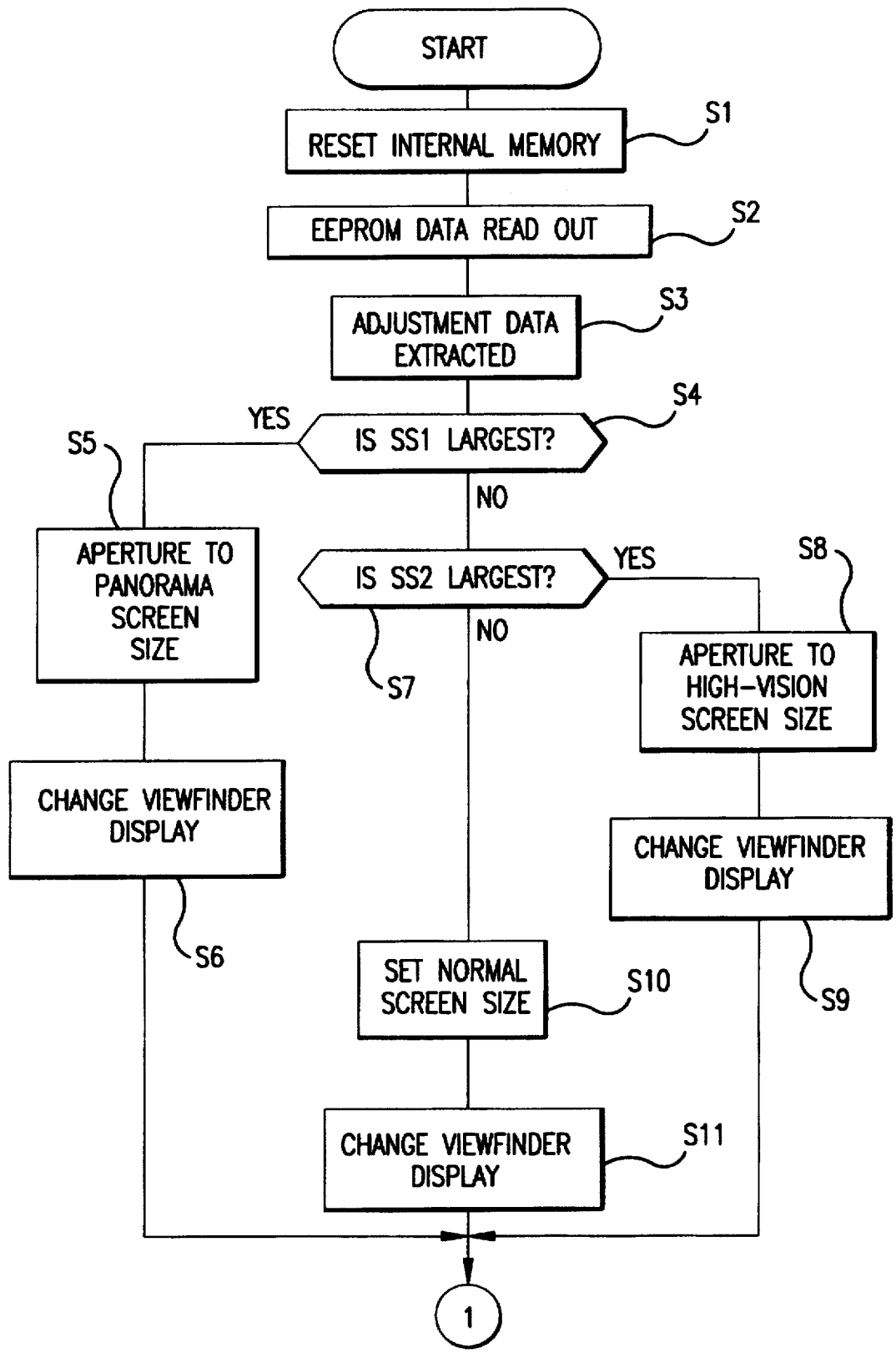
FIG. 3 is a flowchart showing the operations of the CPU in FIG. 1.

FIG. 3 is a flowchart showing the operations of the CPU 8 shown in FIG. 1. The CPU starts the operations in the flowchart when the power switch 2 is turned on.

In step S1, the internal memory of the camera is reset. In step S2, the various data, such as data relating to the exposure as well as numerical values SS1, SS2, SS3 and the like stored in the EEPROM 10 are read. The numerical values SS1, SS2 and SS3 indicate the number of times photographs have been taken using the panorama screen size, the high-vision screen size and the normal screen size, respectively.

In step S3, the CPU extracts adjustment data from the various data read from the EEPROM 10, the adjustment data being comprised, for example, of photometry correction data and used for the purpose of correcting variances between cameras. In step S4, a determination is made as to whether the numerical SS1 is the largest of the numerical values SS1, SS2 and SS3 read from the EEPROM 10. When the determination is affirmative, the CPU moves to step S5 and changes the aperture to the panorama screen size by driving the panorama frame driving motor 9. In step S6, the display in the viewfinder is changed to look like FIG. 2(b) by decreasing the transmissivity of the upper and lower areas of the viewfinder LCD 12, the CPU then moving to step S12 (discussed below).

When the determination in step S4 is negative, the CPU moves to step S7, and a determination is made as to whether the numerical value SS2 is largest. When this determination is affirmative, the CPU moves to step S8 and changes the aperture to the high-vision screen size by driving the panorama frame driving motor 9. In step S9, the display in the viewfinder is changed to look like FIG. 2(a) by making the viewfinder LCD 12 completely transmissive, the CPU the moving to step S12.

When the determination in step S7 is negative, the CPU moves to step S10 and drives the panorama frame driving motor 9 to set the photographic screen size to the normal screen size. In step S11, the display of the viewfinder is changed to look like FIG. 2(c) by decreasing the transmissivity of the left and right areas of the viewfinder LCD 12, the CPU then moving to step S12.

In step S12, the CPU 8 impresses a positive voltage on the base B of the transistor Tr, causing power to be supplied to the controller 3 and causing the controller 3 to operate. In step S13, measurement using the timer 16 is started, the timer 16 being used to determine the time at which to move to the low consumption power supply mode.

In step S14, photometry is commanded of the photometry circuit 4 via the controller 3. In step S15, the focus adjustment information detection circuit 5 is commanded via the controller 3 to start detecting focus adjustment information. In step S16, the results of steps S14 and S15 are read, the diaphragm value, shutter speed and the like are determined, and the results then displayed on the camera body LCD 11.

In step S17, a determination is made as to whether the switch 15 is depressed. If the determination is affirmative, the CPU moves to step S18 and determines whether the photographic screen size immediately prior to the depressing of the switch 15 is the normal screen size. If the determination is affirmative, the CPU moves to step S19 and changes the photographic screen size to the panorama screen size. In step S20, the display in the viewfinder is changed to match the panorama screen size (FIG. 2(b)), and the CPU returns to step S17. When the determination in step S18 is negative, the CPU moves to step S21 and determines whether the screen size is the panorama screen size. If the determination is negative, the CPU moves to step S22 and changes the photographic screen size to the high-vision screen size. In step S23, the display in the viewfinder is changed to match the high-vision screen size (FIG. 2(a)), and the CPU returns to step S17. If the determination in step S21 is affirmative, the CPU moves to step S24 and changes the photographic screen size to the normal screen size. In step S25, the display in the viewfinder is changed to match the normal screen size (FIG. 2(c)), and the CPU returns to step S17.

If the determination in step S17 is negative, the CPU moves to step S26 and determines whether the completely depressed switch 15 is on, i.e., whether the release button is completely depressed. If the determination is affirmative, the CPU moves to step S27, sends the diaphragm value, shutter speed and the like determined in step S16 to the controller 3 and drives the shutter magnet 7 to perform an exposure of the film. If the exposure of the film is completed, the CPU moves to step S28 and commands the film winding motor 6 via the controller 3 to wind the film.

In step S29, a determination is made as to whether the photographic screen size is the panorama screen size. If this determination is affirmative, the CPU moves to step S30 and adds 1 to the numerical value SS1, counting the number of times a photograph is taken using the panorama screen size. In step S31, the numerical value SS1 is stored in the EEPROM 10, and the CPU moves to step S37.

If the determination in step S29 is negative, the CPU moves to step S32, and a determination is made as to whether the photographic screen size is the high-vision screen size. If the determination is affirmative, the CPU moves to step S33 and adds 1 to the numerical value SS2, counting the number of times a photograph is taken using the high-vision screen size. In step S34, the numerical value SS2 is stored in the EEPROM 10, and the CPU moves to step S37.

If the determination in step S32 is negative, the CPU moves to step S35 and adds 1 to the numerical value SS3, counting the number of times a photograph is taken using the normal screen size. In step S36, the numerical value SS3 is stored in the EEPROM 10, and the CPU moves to step S37.

If the determination in step S26 is negative, the CPU moves to step S37, and a determination is made as to whether the time measured on the timer 16 has exceeded a predetermined time. If the determination is negative, the CPU returns to step S37, whereas if the determination is affirmative, the CPU moves to step S38 and sets the voltage impressed on the base B of the transistor Tr to 0 volts. By this means, the transistor Tr is turned off, and the supply of power to the controller 3 is halted. In step S39, the supply of power to components other than limited areas such as the viewfinder LCD 12 and the like is halted, and the process is then completed. In other words, through step S39, the power source 1 is moved to the low consumption power supply mode.

After the camera of FIG. 1 has moved to the low consumption power supply mode, the CPU 8 accomplishes the processes starting with step S12 when the release button is depressed halfway.

Figure 4:
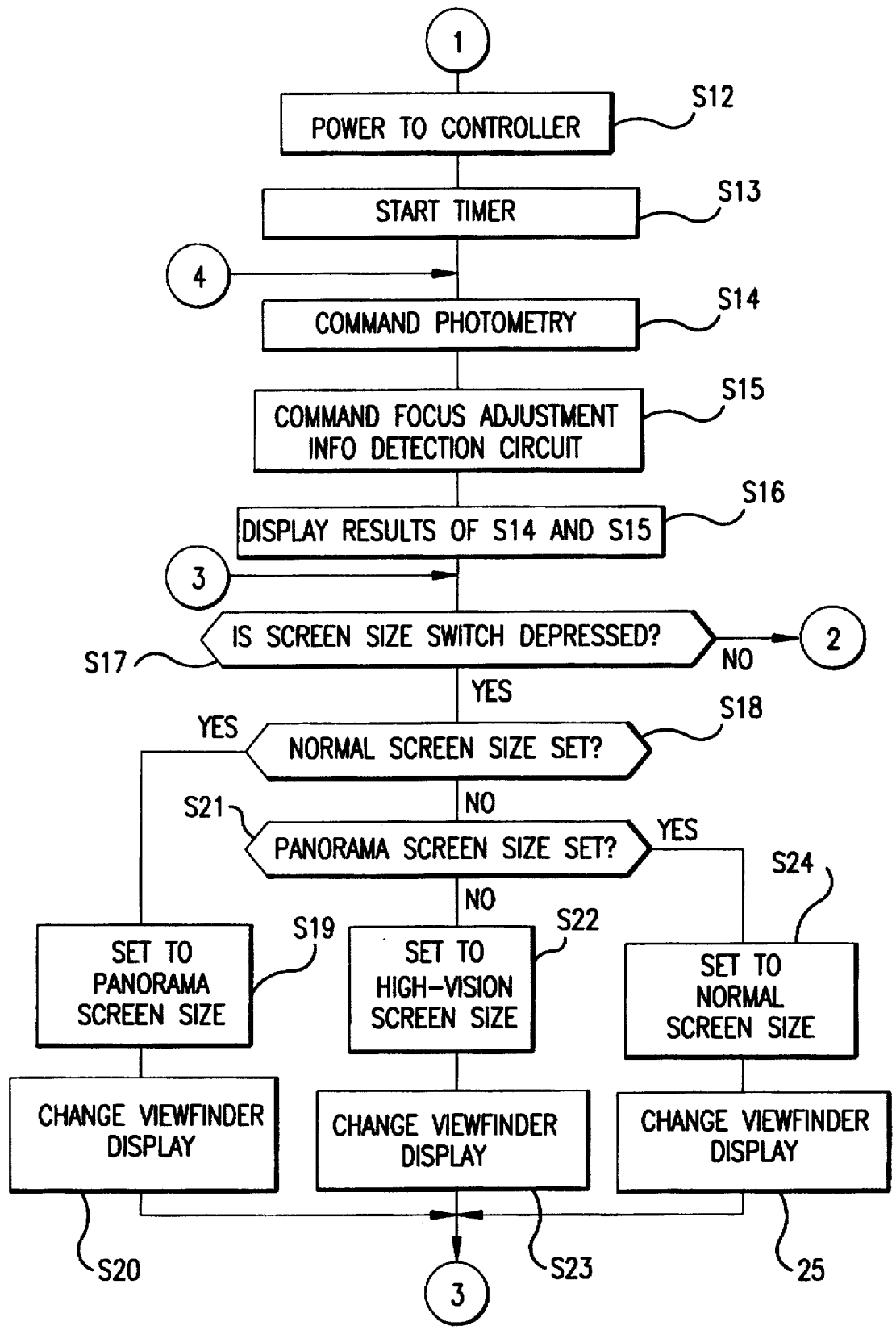
FIG. 4 is a flowchart that follows FIG. 3.
Figure 5:
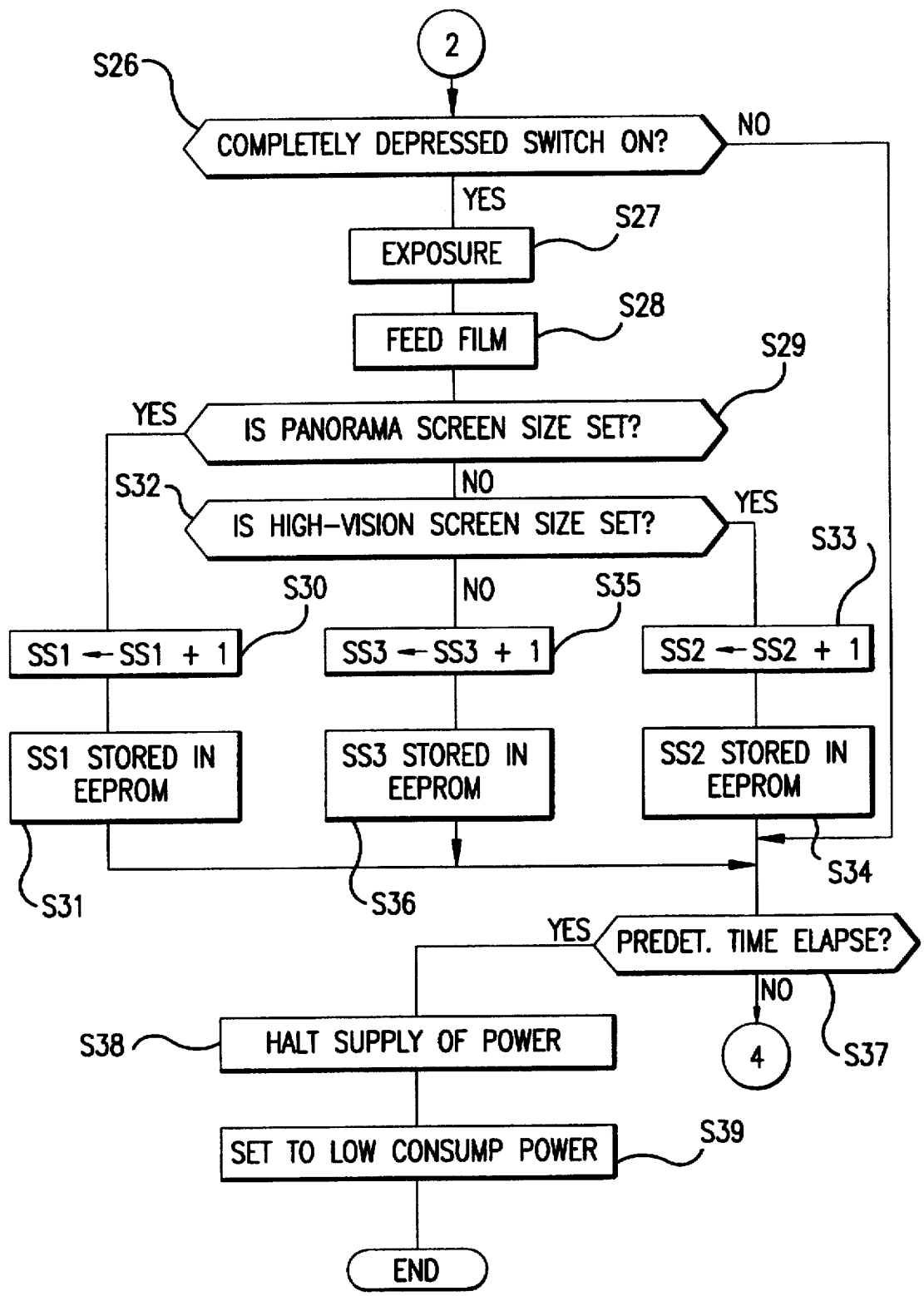
FIG. 5 is a flowchart that follows FIG. 4.

To summarize the operations in the above-described flowcharts of FIGS. 3 to 5, when the power switch 2 is turned on, the CPU 8, in steps S4–S11, first moves the panorama frame and changes the transmissivity of the viewfinder LCD 12 to match the photographic screen size used in the largest number of photographs prior to the current photograph. Following this, in step S13 the timer used for the move to the low consumption power supply mode is started, and in steps S17–S25, the CPU moves the panorama frame and changes the transmissivity of the viewfinder LCD 12 to match the photographic screen size switched to by the switch 15.

When the release button is completely depressed, exposure of the film and winding of the film are accomplished (steps S26–S28), and in steps S29–S36, the number of times each photographic screen size has been selected is calculated and stored in the EEPROM 10. When the time measured on the timer has exceeded a predetermined time without the release button being completely depressed, the camera moves to the low consumption power supply mode by means of steps S37–S39, with power still being supplied to the viewfinder LCD 12.

In this way, with the present embodiment, power is supplied to the viewfinder LCD 12 in not only the normal power supply mode but also in the low consumption power supply mode, and as a result, the photographic range corresponding to the photographic screen size is displayed in the viewfinder even in the low consumption power supply mode. Accordingly, even when time is required for the photographer to determine the composition of the photograph, the actual photographic range is always displayed in the viewfinder, and thus, mistakes in picture taking caused by erroneous photographic ranges can be prevented. In addition, the number of times each photographic screen size is selected is counted, and the camera is automatically switched to the photographic screen size used the largest number of times when the camera power source switch 2 is turned on, and as a result, the number of times the photographer must operate the switch 15 can be reduced.

Second Embodiment

In the first embodiment, the photographic screen size used for the immediately prior photograph is not changed until the switch 15 is again operated after completion of a photograph. However, under actual photographic conditions, cases where a photograph is taken with the panorama screen size are fewer than cases where a photograph is taken with another screen size, and there are many times when the screen size is switched to a mode other than panorama photography following panorama photography. Therefore, in the second embodiment, after completion of a panorama photograph, the photographic screen size is switched to the size used the most for photography, with the exception of the panorama screen size.

Figure 6:
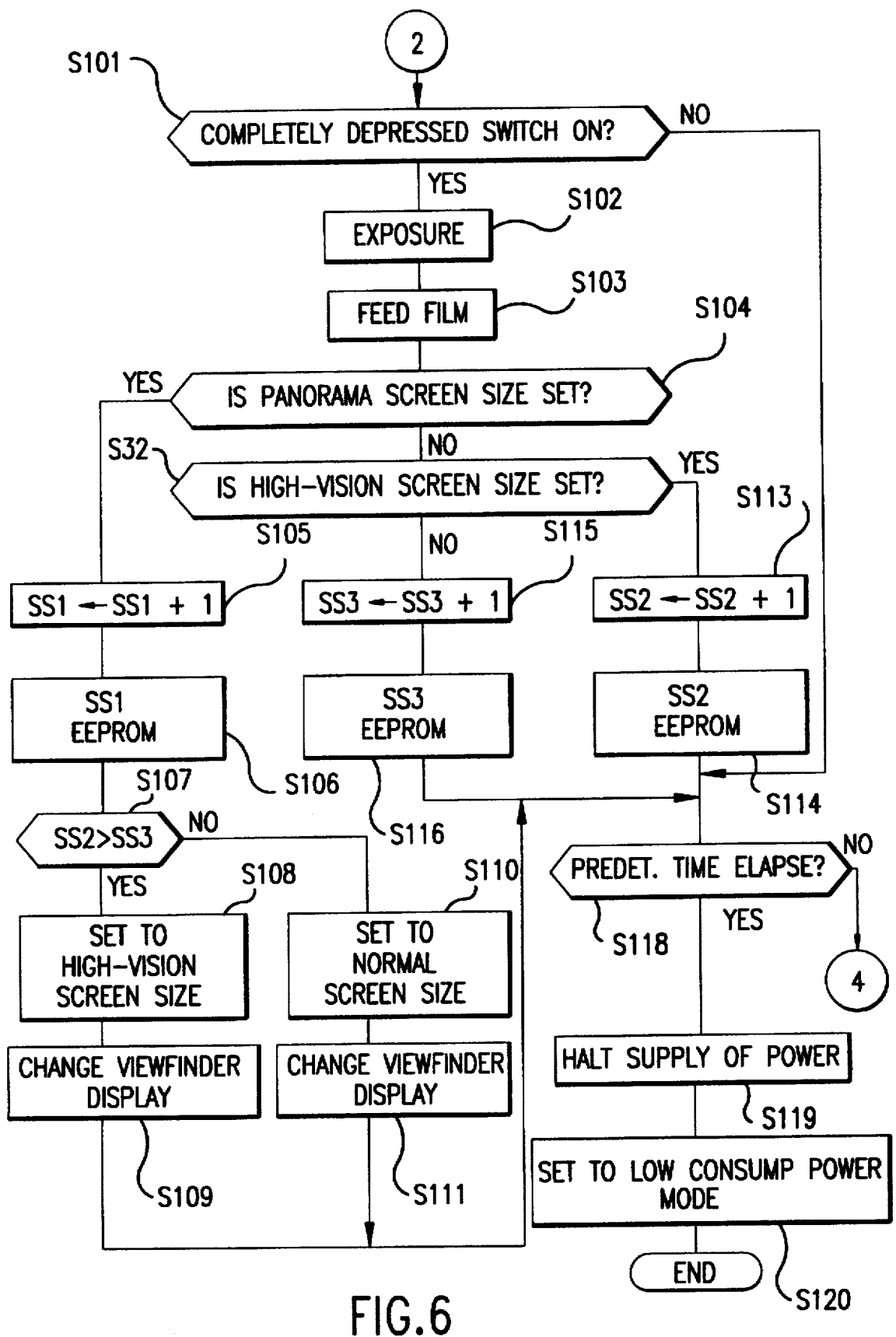
FIG. 6 is an alternative flowchart to that of FIG. 5 that also follows FIG. 4.

The second embodiment is the same as the first embodiment with the exception of the processes conducted by the CPU 8, for which reason the explanation will include only the processes of the CPU 8, with reference to the flowchart in FIG. 6. Similar to the first embodiment, the CPU first conducts the processes in FIGS. 3 and 4 from step S1 to step S25, so this portion of the process is omitted from the flowchart in FIG. 6. In addition, the processes in steps S101 to S106 are the same as the processes in steps S26 to S31 in FIG. 5, so repeated explanation of such is omitted here. In step S107, a determination is made as to whether numerical value SS2, which counts the number of times the high-vision screen size is selected, is larger than numerical value SS3, which counts the number of times the normal screen size is selected. When the determination is affirmative, the CPU moves to step S108 and sets the aperture to the high-vision screen size. In step S109, the display in the viewfinder is changed to match the high-vision screen size (FIG. 2(a)). If the determination in step S107 is negative, the CPU moves to step S110 and sets the aperture to the normal screen size and also changes the display in the viewfinder to match the normal screen size (FIG. 2(c)). Following the process in step S109 or in step S111, the same processes are conducted as in steps S37 to S39 in FIG. 5.

In this way, the second embodiment takes into account the fact that cases of panorama photography are infrequent, and after completion of a panorama photograph, the photographic screen size other than the panorama screen size used most frequently is selected. Thus, after a panorama photograph is taken, the camera promptly returns to the photographic screen size used most frequently by the photographer.

Alternatively, it would also be appropriate to set the screen size after each photograph to the screen size selected the largest number of times out of all possible photographic screen sizes, including the panorama screen size.

In the above-described embodiments, the numerical values SS1, SS2 and SS3, which are used to count the number of times photographs are taken with each photographic screen size, are not initialized, but it would also be appropriate to initialize these values by providing a switch or similar mechanism for this purpose. This would enable the photographer to change the point in time from which the determination is made as to which frame mode is used most frequently. In this manner, for example, when the photographer goes on a trip, for example to the mountains, where panorama photographs are more likely, by initializing the values SS1, SS2 and SS3 at the beginning of the trip, the camera would determine that panorama photographs were used most frequently (if the photographer takes many panorama photographs after initialization), even though prior to the trip (and prior to initialization), the photographer took few panorama photographs.

In the above-described embodiments, three sizes are provided as photographic screen sizes, namely a panorama screen size, a high-vision screen size and a normal screen size, but it would also be appropriate to provide additional or alternate sizes. In addition, in the above-described embodiments, three modes are provided that differ in the amount of power consumption, but it would also be appropriate to provide other modes.

In the above-described embodiments, switching among the photographic screen sizes is accomplished through a single switch, but it would also be appropriate to provide separate switches for each of the photographic screen sizes.

In the above-described embodiments, the time from when the power switch 2 is turned on is measured by a timer 16, but it would also be appropriate to measure the time from when the release button or switch 15 or the like was last operated.

In the above-described embodiments, the panorama frame is caused to move by a panorama frame driving motor 9, but it would also be appropriate to cause the panorama frame to move mechanically by linking it to the operation of the switch 15.

In the above-described embodiments, the photographic screen size is switched by causing the panorama frame to move, but as disclosed in Japanese Laid Open Patent Application No. 64-21433, it would also be appropriate, instead of switching the photographic screen size, to make an optical mark on the film at the time of picture taking and to use this mark to switch the screen size at the time of printing the photograph on photographic paper. It would also be appropriate, instead of an optical mark, to record the screen size by making a magnetic mark on the film.

In embodiments having this type of structure, the switch 15 corresponds to the screen size switching means, the viewfinder LCD 12 corresponds to the display means, the power source 1 corresponds to the power source means, the CPU 8 corresponds to the control means, the timer 16 corresponds to the counting means, the structure performing steps S17 to S25 in FIG. 4 corresponds to the primary selection means, and the structure performing steps S107 to S111 in FIG. 6 corresponds to the second selection means.

As explained in detail above, with the present invention a display is performed in the viewfinder in accordance with the photographic screen size switched to by the screen size switching means when either the normal power supply mode or the low consumption power supply mode is in use. Accordingly, verification of the photographic range can be accomplished even when the low consumption power supply mode is in use, and photographic mistakes caused by an erroneous photographic range can be avoided.

When the power switch is turned on, the photographic screen size selected most frequently out of all possible photographic screen sizes is selected, and the display in the viewfinder is changed in accordance with the selected photographic screen size. Consequently, the photographic screen size most frequently used by the photographer is promptly selected when the power source in the camera is engaged.

In an alternative arrangement, after completion of photography using the panorama screen size, the photographic screen size counted the largest number of times by the counting means is selected, excluding the number of times the panorama screen size is selected, and the display is changed to match this photographic screen size. Consequently, the photographic screen size most frequently used by the photographer is promptly selected when panorama photography is completed.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A camera capable of performing photography in a plurality of photographic screen sizes, the camera comprising:

a screen size switching device that switches between said plurality of photographic screen sizes;

a display that displays in a viewfinder the photographic screen sizes;

a power source providing a first amount of power to the camera when the power source is switched on and the camera is in a normal power supply mode and a second amount of power, smaller than the first amount of power, when the camera is in a low consumption power supply mode, said camera switching from the normal power supply mode to the low consumption power supply mode after a predetermined time interval has elapsed after the power source is switched on;

means for switching from the normal power supply mode to the low consumption power supply mode after said predetermined time interval has elapsed; and a controller coupled to the display, said controller controlling the display to display in the viewfinder a selected photographic screen size switched to by the screen size switching device when the camera is in the normal power supply mode and when the camera is in the low consumption power supply mode.

2. The camera as claimed in claim 1, wherein said plurality of photographic screen sizes comprises a normal screen size, a high-vision screen size, and a panorama screen size.

3. The camera as claimed in claim 1, further comprising a counter coupled to said screen size switching device and to said controller, said counter counting a number of times photographs have been taken using each of the plurality of photographic screen sizes, wherein when said power source is switched on, said controller selects a most frequent photographic screen size of said plurality of photographic screen sizes in accordance with said counter, and wherein said controller controls said display to display the most frequent photographic screen size.

4. The camera as claimed in claim 3, wherein when said screen size switching device is activated and a current one of said plurality of photographic screen sizes is changed to another one of said plurality of photographic screen sizes, said counter increments a count of said another one of said plurality of photographic screen sizes.

5. The camera as claimed in claim 4, wherein after photography in said another one of said plurality of photographic screen sizes, said most frequent photographic screen size is selected by said controller.

6. The camera as claimed in claim 1, further comprising a counter, wherein when said screen size switching device is activated and a current one of said plurality of photographic screen sizes is changed to another one of said plurality of photographic screen sizes, the counter increments a count of said another one of said plurality of photographic screen sizes.

7. The camera as claimed in claim 1, further comprising a release button effecting photography with said camera and a timer timing said predetermined time interval, wherein if said release button is not depressed before said predetermined time interval has elapsed after said power source is switched on, said power source switches to operate in said low consumption power supply mode.

8. A camera capable of switching a photographic screen size, comprising:

a screen size switching device that switches the photographic screen size between a panorama screen size and a plurality of other screen sizes;

a display that displays in a viewfinder the photographic screen sizes;

a power source that supplies power to the camera;

a counter coupled with said screen size switching device, said counter counting a number of times each photographic screen size is selected;

a selection device that selects a frequent photographic screen size that has been counted the largest number of times by the counter, excluding the number of times the panorama screen size has been selected; and a controller coupled to said display, said controller controlling the display to display in the viewfinder the photographic screen size selected by the selection device after photography with the panorama screen size has been completed, wherein the photographic screen size switching device switches to the photographic screen size selected by the selection device after photography with the panorama screen size has been completed.

9. A method of operating a camera capable of performing photography in a plurality of photographic screen sizes, the method comprising:

supplying power with a power source to the camera in one of at least two power supply modes, the power supply modes comprising a normal power supply mode supplying a first amount of power to the camera when the camera is switched on and a low consumption power supply mode supplying a second amount of power, smaller than the first amount of power, to the camera after a predetermined time interval has elapsed after the power source is switched on;

switching between said plurality of photographic screen sizes when the camera is in the normal power supply mode and when the camera is in the low consumption power supply mode; and controlling a display of the camera to display the photographic screen size switched to in the switching step.

10. The method as claimed in claim 9, further comprising:

counting a number of times photographs have been taken using each of the plurality of photographic screen sizes and, when said power source is switched on, switching to a photographic screen size in accordance with said counting step.

11. The method as claimed in claim 10, wherein when said screen size is switched and a current one of said plurality of photographic screen sizes is changed to another one of said plurality of photographic screen sizes, the method comprising incrementing a count of said another one of said plurality of photographic screen sizes.

12. The method as claimed in claim 11, wherein, after photography in said another one of said plurality of photographic screen sizes, further comprising switching to a most frequent photographic screen size.

13. The method as claimed in claim 9, further comprising, when said screen size is switched and a current one of said plurality of photographic screen sizes is changed to another one of said plurality of photographic screen sizes, incrementing a count of said another one of said plurality of photographic screen sizes.

14. The method as claimed in claim 9, wherein the camera comprises a release button effecting photography with said camera and wherein if said release button is not depressed before said predetermined time interval has elapsed after said power source is switched on, said power source switches to said low consumption power supply mode.

15. A method of operating a camera capable of switching a photographic screen size, the method comprising:

switching of the photographic screen size between a panorama screen size and a plurality of other screen sizes;

supplying power to the camera;

counting a number of times each photographic screen size is selected;

selecting a photographic screen size that has been counted the largest number of times in the counting step, excluding the number of times the panorama screen size has been selected; and controlling a display of the camera to display in the viewfinder of the camera the photographic screen size selected in the selecting step after photography with the panorama screen size has been completed, wherein the method comprises switching to the photographic screen size selected in the selecting step after photography with the panorama screen size has been completed.

* * * * *